United States Patent
Azuma et al.

(10) Patent No.: US 12,406,694 B2
(45) Date of Patent: Sep. 2, 2025

(54) MAGNETIC DISK-USE GLASS SUBSTRATE MANUFACTURING METHOD, DISCOIDAL GLASS SUBSTRATE, GLASS SUBSTRATE, AND MAGNETIC DISK-USE GLASS SUBSTRATE

(71) Applicant: HOYA CORPORATION, Tokyo (JP)

(72) Inventors: Shuhei Azuma, Hung Yen (VN); Toshio Takizawa, Yamanashi (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 18/845,828

(22) PCT Filed: Mar. 13, 2023

(86) PCT No.: PCT/JP2023/009666
§ 371 (c)(1),
(2) Date: Sep. 10, 2024

(87) PCT Pub. No.: WO2023/171824
PCT Pub. Date: Sep. 14, 2023

(65) Prior Publication Data
US 2025/0201272 A1 Jun. 19, 2025

(30) Foreign Application Priority Data

Mar. 11, 2022 (JP) ................. 2022-037807

(51) Int. Cl.
*B32B 3/00* (2006.01)
*C03C 23/00* (2006.01)
*G11B 5/73* (2006.01)
*G11B 5/84* (2006.01)

(52) U.S. Cl.
CPC ............ *G11B 5/73921* (2019.05); *B32B 3/00* (2013.01); *C03C 23/0025* (2013.01); *G11B 5/8404* (2013.01)

(58) Field of Classification Search
CPC .................................................. G11B 5/73921
See application file for complete search history.

(56) References Cited

U.S. PATENT DOCUMENTS

| | | |
|---|---|---|
| 2002/0108400 A1 | 8/2002 | Watanabe et al. |
| 2022/0227654 A1 | 7/2022 | Azuma |
| 2022/0274870 A1 | 9/2022 | Azuma |
| 2024/0109807 A1 | 4/2024 | Azuma |

FOREIGN PATENT DOCUMENTS

| | | |
|---|---|---|
| JP | 2002150546 A | 5/2002 |
| WO | 2020262702 A1 | 12/2020 |
| WO | 2021020587 A1 | 2/2021 |

OTHER PUBLICATIONS

Translation of the International Search Report mailed on May 30, 2023.

*Primary Examiner* — Elizabeth E Mulvaney
(74) *Attorney, Agent, or Firm* — Global IP Counselors, LLP

(57) ABSTRACT

A disk-shaped glass substrate manufacturing method for manufacturing a glass substrate (1) includes preparing a disk-shaped glass blank having main surfaces (11a, 11b) and an outer circumferential end face (12), and irradiating the disk-shaped glass blank with a laser beam (L) along a distance longer than one lap of the outer circumferential end face (12) of the disk-shaped glass blank.

13 Claims, 4 Drawing Sheets

MAGNETIC DISK-USE GLASS SUBSTRATE MANUFACTURING METHOD, DISCOIDAL GLASS SUBSTRATE, GLASS SUBSTRATE, AND MAGNETIC DISK-USE GLASS SUBSTRATE

CROSS-REFERENCE TO RELATED APPLICATIONS

This is a U.S. National stage application of International Patent Application No. PCT/JP2023/009666, filed on Mar. 13, 2023, which, in turn, claims priority to Japanese Patent Application No. 2022-037807, filed in Japan on Mar. 11, 2022. The entire contents of Japanese Patent Application No. 2022-037807 are hereby incorporated herein by reference.

BACKGROUND

Field of the Invention

The present invention relates to a disk-shaped glass substrate manufacturing method, an annular glass substrate manufacturing method, and a magnetic-disk glass substrate manufacturing method, which include performing shape processing using a laser beam, and to a disk-shaped glass substrate, an annular glass substrate, and a magnetic-disk glass substrate.

Background Information

Nowadays, hard disk apparatuses for recording data are used in personal computers, laptops, DVD (Digital Versatile Disc) recording apparatuses, data centers for cloud computing, and the like. A magnetic disk obtained by providing a magnetic layer on a magnetic-disk glass substrate, which is an annular non-magnetic body, is used in a hard disk apparatus.

Conventionally, in such a magnetic-disk glass substrate manufacturing method, a technique has been known in which an annular glass blank is cut from a glass plate, and the inner and outer circumferential end faces of the annular glass blank are irradiated with a laser beam to smooth the inner and outer circumferential end faces and form chamfered surfaces (JP 2002-150546A). Specifically, the inner and outer circumferential end faces of the annular glass blank are irradiated with a laser beam to heat them to a temperature higher than or equal to the softening point of the glass, thereby melting the inner and outer circumferential end faces. As a result, the inner and outer circumferential end faces are smoothed and chamfered surfaces are formed.

SUMMARY

However, in the above-described technique, when irradiation with a laser beam is performed along a distance of one lap of each of the inner circumferential end face and the outer circumferential end face of the annular glass blank, the inner circumferential end face and the outer circumferential end face are smoothed and chamfered surfaces are formed, but the roundness of the inner circumferential end face and/or outer circumferential end face after irradiation with a laser beam L deteriorates (increases) in some cases. When an annular glass substrate with deteriorated roundness at the inner circumferential end face and/or outer circumferential end face is used as a magnetic-disk glass substrate, it is conceivable that air flow will be disturbed during high-speed rotation, possibly causing fluttering.

The present invention has been made to solve the above-described problems, and aims to provide a technique for irradiating an end face of a disk-shaped glass blank or an annular glass blank with a laser beam, thereby smoothing the end face and forming a chamfered surface without deteriorating the roundness of the end face after the irradiation with the laser beam.

According to a first aspect of the present invention, there is provided a disk-shaped glass substrate including:
a main surface; and
an outer circumferential end face.

The outer circumferential end face has at least two regions with different roughnesses in a circumferential direction of the outer circumferential end face.

In the disk-shaped glass substrate according to the first aspect of the present invention, the at least two regions with different roughnesses may include a low-roughness region and a high-roughness region.

In the circumferential direction of the outer circumferential end face, a length of the low-roughness region may be shorter than a length of the high-roughness region.

In the disk-shaped glass substrate according to the first aspect of the present invention, the at least two regions with different roughnesses may both be regions smoothed by irradiation with a laser beam.

In the disk-shaped glass substrate according to the first aspect of the present invention, a roundness of the outer circumferential end face may be 15 μm or less.

According to a second aspect of the present invention, there is provided a glass substrate including:
a main surface; and
an outer circumferential end face and an inner circumferential end face that has an annular shape.

The inner circumferential end face has at least two regions with different roughnesses in a circumferential direction of the inner circumferential end face.

In the glass substrate according to the second aspect of the present invention, the at least two regions with different roughnesses may include a low-roughness region and a high-roughness region.

In the circumferential direction of the inner circumferential end face, a length of the low-roughness region may be shorter than a length of the high-roughness region.

In the glass substrate according to the second aspect of the present invention, the at least two regions with different roughnesses may both be regions smoothed by irradiation with a laser beam.

In the glass substrate according to the second aspect of the present invention, a roundness of the inner circumferential end face may be 15 μm or less.

In the disk-shaped glass substrate according to the first aspect of the present invention, the main surface is a mirror surface.

In the glass substrate according to the second aspect of the present invention, the glass substrate is an annular glass substrate.

In the glass substrate according to the second aspect of the present invention, the main surface is a mirror surface.

According to a third aspect of the present invention, there is provided a magnetic-disk glass substrate manufacturing method comprising at least polishing the main surface of the disk-shaped glass substrate according to the first aspect of the present invention.

According to a fourth aspect of the present invention, there is provided a magnetic-disk glass substrate manufacturing method comprising at least polishing the main surface of the glass substrate according to the second aspect of the present invention.

According to the present invention, it is possible to provide a technique for smoothing an end face of a disk-shaped glass substrate or an annular glass substrate and forming a chamfered surface without deteriorating the roundness of the end face.

DETAILED DESCRIPTION OF THE EMBODIMENTS

First, a disk-shaped glass substrate manufactured using the manufacturing method of this embodiment will be described with reference to FIGS. 1A to 1C.

Figure 1A:
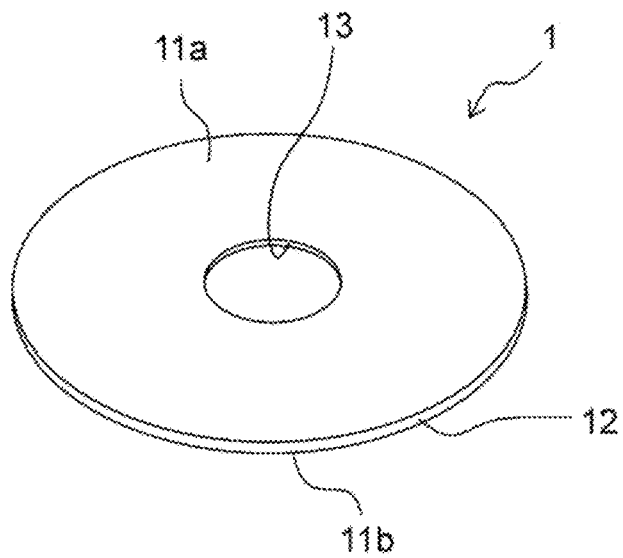
FIG. 1A is a perspective view showing an example of a glass substrate manufactured using a manufacturing method of this embodiment.

As shown in FIG. 1A, a glass substrate 1 is a thin glass substrate having a disk shape. The glass substrate 1 having a disk shape may have a circular hole (central hole) formed in the center, the circular hole being concentric with the outer circumferential end. That is, the glass substrate 1 may have an annular shape. In the following description, a glass substrate having a disk shape is referred to as a disk-shaped glass substrate, and a glass substrate having an annular shape is referred to as an annular glass substrate. The concept of a disk-shaped glass substrate also includes an annular glass substrate, and an annular glass substrate is one example of a disk-shaped glass substrate.

The glass substrate 1 is used, for example, as a magnetic-disk substrate, a semiconductor substrate, or a support substrate for a semiconductor wafer. When used as a magnetic-disk substrate, the size of the glass substrate 1 does not matter, but it is a size suitable for a magnetic disk having a nominal diameter of 2.5 inches or more (e.g., 2.5 inches, 3.5 inches, 5 inches, etc.). In the case of a magnetic-disk glass substrate having a nominal diameter of 2.5 inches, for example, the outer diameter is 55 to 70 mm, the diameter of the central hole is 20 mm, and the plate thickness is 0.3 to 0.8 mm. In the case of a magnetic-disk glass substrate having a nominal diameter of 3.5 inches, for example, the outer diameter is 85 to 100 mm, the diameter of the central hole is 25 mm, and the plate thickness is 0.3 to 0.8 mm. Also, when used as a semiconductor substrate or a support substrate for a semiconductor wafer, the central hole is not required, and for example, the outer diameter is 50 to 500 mm, and the plate thickness is 0.3 to 1.5 mm. Hereinafter, an annular glass substrate 1 that has a central hole and is to be used as a magnetic-disk substrate will be described as a representative example.

The glass substrate 1 includes two main surfaces 11a and 11b that oppose each other, an outer circumferential end face 12, and an inner circumferential end face 13 that defines a central hole. The main surface 11a is an annular surface whose outer edge and inner edge form two concentric circles. The main surface 11b has the same shape as that of the main surface 11a, and is concentric with the main surface 11a. The outer circumferential end face 12 is a surface that connects the outer edge of the main surface 11a and the outer edge of the main surface 11b. The inner circumferential end face 13 is a surface that connects the inner edge of the main surface 11a and the inner edge of the main surface 11b.

Figure 1B:
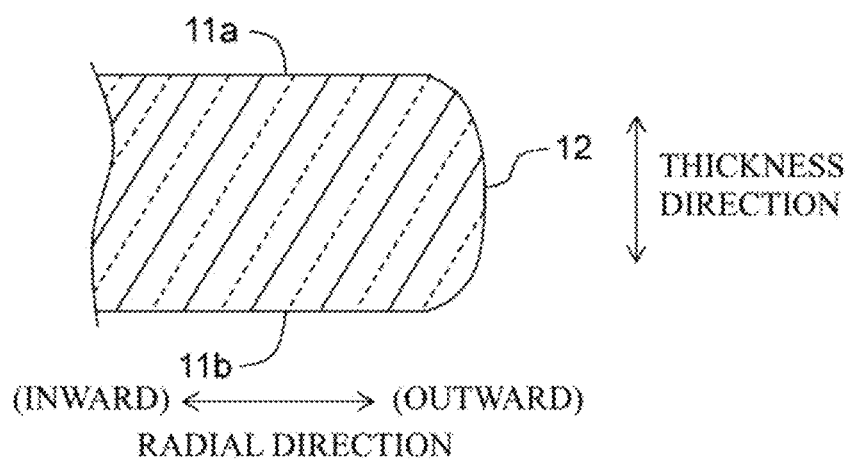
FIG. 1B is a diagram showing an example of a cross-sectional shape of an outer circumferential end face of the glass substrate manufactured using the manufacturing method of this embodiment.

As shown in FIG. 1B, connection portions between an outer circumferential end face 12 and main surfaces 11a and 11b are each rounded. In other words, corners formed by the outer circumferential end face 12 and the main surfaces 11a and 11b are each chamfered. As a result, the outer circumferential end face 12 curves smoothly such that the central portion in the thickness direction of the glass substrate 1 protrudes outward in the radial direction of the glass substrate 1. Note that the outer circumferential end face 12 may or may not be a single curved surface overall. For example, a face that is approximately perpendicular to the main surface 11a (a face that is linear in a cross-sectional view) may be present in the central portion in the plate thickness direction of the outer circumferential end face 12. The length, in the radial direction of the main surface 11a, of the portion (hereinafter also referred to as the chamfered surface) that is inclined with respect to the main surface 11a as a result the above-mentioned chamfering is defined as the difference between the radius at the position where the outer circumferential end face 12 protrudes the most in the radial direction and the radius at the position where the main surface 11a starts to incline, and can be, for example, 30 to 300 μm. Also, the length in the plate thickness direction of the chamfered surface is defined as, when a tangent line is drawn in the plate thickness direction using the position where the outer circumferential end face 12 protrudes the most in the radial direction as a tangent point, the distance in the plate thickness direction from the tangent point to a plane including the main surface 11a, and can be, for example, from 30 μm to half the length of the plate thickness. Here, in a case where there are a plurality of possible positions where the outer circumferential end face 12 protrudes the most, such as a case where there is a surface that is approximately perpendicular to the main surface 11a at the central portion in the plate thickness direction of the outer circumferential end face 12, the minimum value among the possible values for the above-mentioned "distance in the thickness direction" may be used as the "distance in the thickness direction".

Figure 1C:
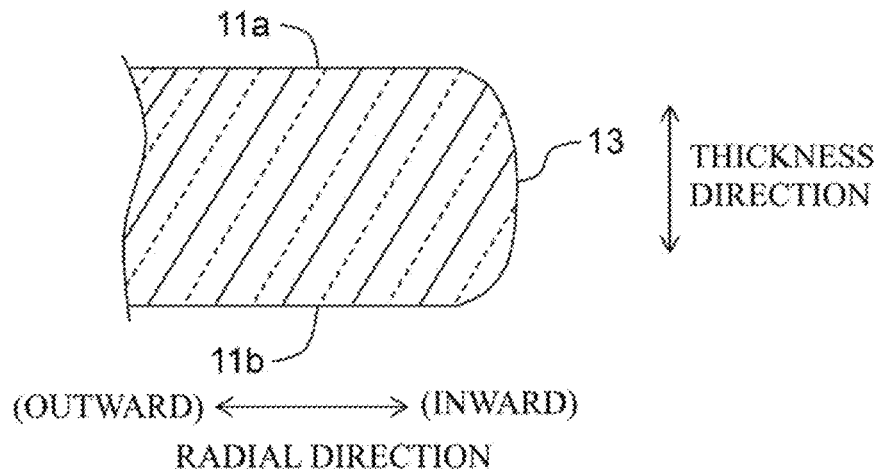
FIG. 1C is a diagram showing an example of a cross-sectional shape of an inner circumferential end face of the glass substrate manufactured using the manufacturing method of this embodiment.

As shown in FIG. 1C, the connection portions between the inner circumferential end face 13 and the main surfaces 11a and 11b are each rounded. In other words, the corners formed by the inner circumferential end face 13 and the main surfaces 11a and 11b are each chamfered. As a result, the inner circumferential end face 13 smoothly curves such that the central portion in the thickness direction of the glass substrate 1 protrudes inward in the radial direction of the glass substrate 1. The inner circumferential end face 13 may or may not be one curved surface overall. For example, at the central portion in the plate thickness direction of the inner circumferential end face 13, there may be a face that is approximately perpendicular to the main surface 11a (a face that is linear in a cross-sectional view).

When a magnetic disk is manufactured using the glass substrate 1, at least the main surfaces 11a and 11b are polished, and then magnetic layers are formed on the main surfaces 11a and 11b. Note that the main surfaces 11a and 11b may be ground before the polishing if needed.

Here, when forming magnetic layers on the main surfaces 11a and 11b of the glass substrate 1, in order to reliably grip the outer circumferential end face 12 and/or the inner circumferential end face 13 of the glass substrate 1 with a jig, it is desirable that the outer circumferential end face 12 and/or the inner circumferential end face 13 of the glass substrate 1 is matched to a target shape. Also, in order to accurately incorporate the magnetic disk into an HDD device, it is desirable that the outer circumferential end face 12 and/or the inner circumferential end face 13 of the glass substrate 1 is matched to a target shape. Furthermore, in order to prevent minute particles from adhering to the main surfaces and adversely affecting the performance of the magnetic disk, it is desirable that the outer circumferential end face 12 and/or the inner circumferential end face 13, where particles are likely to be generated, are smooth.

In view of this, in this embodiment, in order to process the outer circumferential end face 12 into the cross-sectional shape shown in FIG. 1B and process the inner circumferential end face 13 into the cross-sectional shape shown in FIG. 1C, end face processing is performed using a laser beam on an annular glass blank 1', which is the material for the annular glass substrate 1.

Next, processing for separating the annular glass blank and end face processing using a laser beam will be described.

(Processing for Separating Annular Glass Blank)

The processing for separating the annular glass blank is processing for separating the annular glass blank 1' from a sheet-like glass plate. Here, the glass plate may be made of aluminosilicate glass, soda lime glass, borosilicate glass, or the like. In particular, amorphous aluminosilicate glass can be preferably used in that it can be chemically strengthened as necessary and can produce a magnetic-disk glass substrate in which the flatness of the main surface of the substrate and the strength of the substrate are excellent. Such a glass plate may be produced using, for example, a float method or an overflow downdraw method, or may be produced by press-molding a lump of molten glass using a mold. Methods for separating the annular glass blank 1' from the glass plate include a method of cutting the glass plate by making a cutting line using a known scriber, or a method of irradiating the glass plate with a laser beam to form a circular defect and then separating the glass plate along the circular defect. Note that after the annular glass blank 1' is separated from the sheet-like glass plate and before the end face processing is performed, it is preferable that the outer circumferential end face 12' is approximately orthogonal to the main surfaces 11a and 11b, and it is preferable that the inner circumferential end face 13' is also approximately orthogonal to the main surfaces 11a and 11b. When the end face is approximately orthogonal to the main surfaces in this manner, it is easy to align the chamfer shapes on both sides of the end face when performing the end face processing. Note that the surface roughness of the outer circumferential end face and the inner circumferential end face before the end face processing is, for example, 0.1 μm or more in terms of arithmetic mean roughness Ra. Here, the arithmetic mean roughness Ra is a value conforming to JIS B0601:2001. The arithmetic mean roughness Ra of the end face surface can be measured using, for example, a laser microscope in an evaluation range of 50 μm×50 μm under the following conditions.

Observation magnification: 3000-fold,
Measurement pitch in height direction (Z axis): 0.01 μm,
Cutoff value λs: 0.25 μm,
Cutoff value λc: 80 μm.

Note that the resolution in the height direction is preferably 1 nm or less. Also, the observation magnification can be, for example, 3000-fold, but may be selected as appropriate within the range of about 1000-fold to 3000-fold depending on the size of the measurement surface.

(End Face Processing Using Laser Beam)

Figure 2:
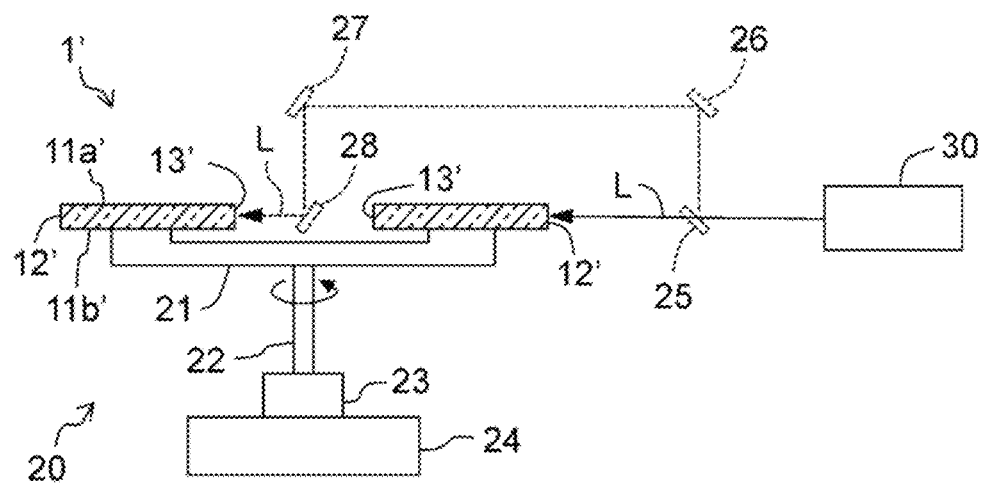
FIG. 2 is a diagram showing an example of a rotation device and a laser irradiation device for performing end face processing included in the manufacturing method of this embodiment.

Next, end face processing using a laser beam is performed individually on an outer circumferential end face 12' and an inner circumferential end face 13' of the glass blank 1' separated from the sheet-like glass plate. In the end face processing, the outer circumferential end face 12' or the inner circumferential end face 13' of the glass blank 1' is irradiated with a laser beam L while the outer circumferential end face 12' or the inner circumferential end face 13' and the laser beam L are moved relative to each other. At this time, it is preferable that the relative speed between the outer circumferential end face 12' or the inner circumferential end face 13' of the glass blank 1' and the laser beam L is constant. By keeping the relative speed constant, the configuration of the device for end face processing can be simplified. In the end face processing, for example, as shown in FIG. 2, while a rotation device 20 rotates the glass blank 1' at a constant speed, a laser irradiation device 30 irradiates the outer circumferential end face 12' and the inner circumferential end face 13' with the laser beam L. Note that only one of the end face processing for the outer circumferential end face 12' and the end face processing for the inner circumferential end face 13' may also be performed. When both are implemented, either one may be performed first, or they may be performed simultaneously.

The rotation device 20 includes a placement platform 21 on which the glass blank 1' is placed, a rotation shaft 22 connected to the placement platform 21, a rotation motor 23 that is connected to the rotation shaft 22 and rotates the rotation shaft 22, and a support platform 24 supporting the rotation motor 23. By rotating the rotation shaft 22 at a constant speed using the rotation motor 23, the placement platform 21 connected to the rotation shaft 22 rotates at a constant speed. Then, due to the placement platform 21 rotating at a constant speed, the glass blank 1' placed on the placement platform 21 also rotates at a constant speed. The glass blank 1' is placed on the placement platform 21 such that the center position of the glass blank 1' approximately coincides with the rotation center position of the rotation shaft 22. Although not shown in the drawings, a heater for heating the glass blank 1' may also be provided.

The laser irradiation device 30 includes a laser beam source, an optical system, a focusing lens, and the like, and irradiates a portion of the outer circumferential end face 12' and a portion of the inner circumferential end face 13' with the laser beam L in order to soften the portion of the outer circumferential end face 12' and the portion of the inner circumferential end face 13'. The type of the laser beam L is not particularly limited as long as the irradiated portion is softened, but a $CO_2$ laser, for example, is preferably used. The oscillation form of the laser beam L is not particularly limited, and may be, for example, continuous wave light (CW light), pulsed wave light, modulated continuous wave light, or another oscillation form. Also, in order to promote the softening of the outer circumferential end face 12' and the inner circumferential end face 13', the glass blank 1' may be heated with a heater or the like as appropriate while being irradiated with the laser beam.

The method for irradiating the end faces with the laser beam L may be any method by which the end faces can be smoothed (softened and/or melted) and chamfered. When the outer circumferential end face 12' is irradiated with the laser beam L, it is preferable to perform irradiation from a normal direction of the outer circumferential end face 12', for example, as indicated by the solid line in FIG. 2. This normal direction includes a range of inclination angles of up to 20 degrees with respect to the normal direction as the allowable range. Also, when irradiating the inner circumferential end face 13' with the laser beam L, for example, as indicated by the dotted line in FIG. 2, irradiation can be performed from the normal direction of the inner circumferential end face 13' by using mirrors 25 to 27 to adjust the optical path of the laser beam L to irradiate a mirror 28 arranged inside the central hole of the glass blank 1' with the laser beam L from above the central hole of the glass blank 1' and reflect the laser beam L with the mirror 28. When the inner circumferential end face 13' is irradiated with a laser beam as well, it is preferable to perform irradiation from the normal direction. This normal direction includes a range of inclination angles of up to 20 degrees with respect to the normal direction as the allowable range. Note that the spot diameter of the laser beam L on the outer circumferential end face 12' is preferably larger in the circumferential direction of the outer circumferential end face 12' than in the thickness direction of the glass blank 1'. In this case, the energy of the laser beam L can be used efficiently to chamfer the corners on the main surface 11a side and the corners on the main surface 11b side. Note that the width of the spot diameter in the circumferential direction of the outer circumferential end face 12' can be, for example, 1 mm or more, and is preferably 2 mm or more. Note that the upper limit of the width in the circumferential direction is, for example, 20 mm. If the width exceeds 20 mm, the laser beam becomes susceptible to the influence of the radius of curvature of the outer circumferential end face 12', and it may become difficult to heat the outer circumferential end face 12'. Also, the width of the spot diameter in the thickness direction of the glass blank 1' can be, for example, 0.5 mm or more, but is preferably larger than the plate thickness of the glass blank 1', and more preferably 1 mm or more. The upper limit of the width in the thickness direction is, for example, 10 times the plate thickness, from the viewpoint of heating efficiency. By irradiating the glass blank 1' with the laser beam L such that the luminous flux (spot) of the laser beam L spreads evenly on both sides in the thickness direction of the glass blank 1', it is possible to easily and evenly chamfer the corners on the main surface 11a side and the corners on the main surface 11b side. Note that if the width of the spot diameter in the thickness direction of the glass blank 1' is less than 0.5 mm, adjustment of the optical system of the laser irradiation device 30 may become difficult. The spot diameter of the laser beam L on the inner circumferential end face 13' is the same as the spot diameter of the laser beam L on the outer circumferential end face 12'.

In this manner, by irradiating the outer circumferential end face 12' of the annular glass blank 1' with the laser beam L to heat it, the outer circumferential end face 12' can be softened and processed into a curved surface protruding outward in the radial direction, for example, as shown in FIG. 1B. Similarly, by irradiating the inner circumferential end face 13' of the annular glass blank 1' with the laser beam L to heat it, the inner circumferential end face 13' can be softened and processed into a curved surface protruding inward in the radial direction, for example, as shown in FIG. 1C.

Figure 3A:
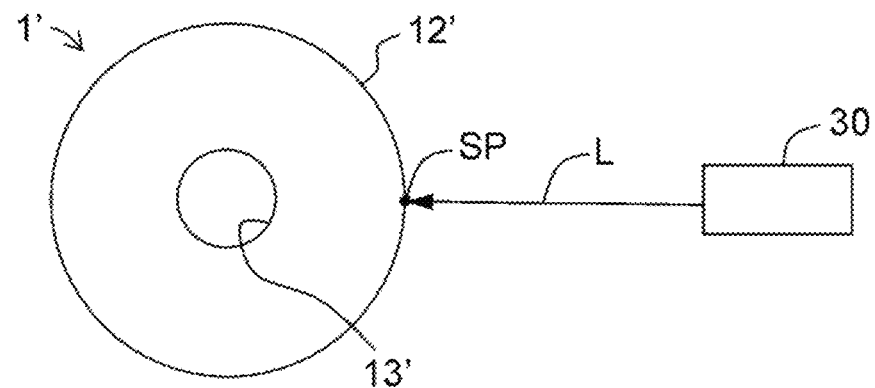
FIG. 3A is a diagram showing a state where irradiation of the outer circumferential end face of a glass blank with a laser beam has been started in the end face processing using a laser beam, the end face processing being included in the manufacturing method of this embodiment.
Figure 3B:
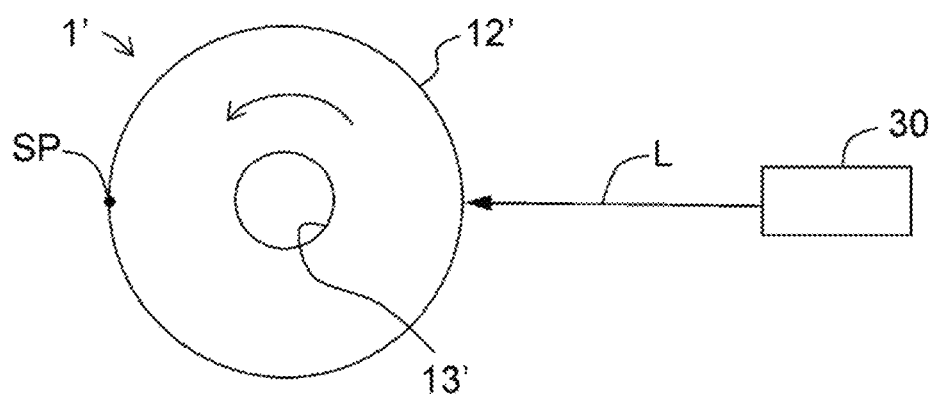
FIG. 3B is a diagram showing a state where irradiation of the outer circumferential end face of the glass blank with the laser beam has progressed.

Next, taking the outer circumferential end face 12' of the annular glass blank 1' as an example, a state where the outer circumferential end face 12' is irradiated with the laser beam L will be described. First, the rotation device 20 starts to rotate the glass blank 1'. Note that in this embodiment, as shown in FIG. 3A, the rotation device 20 rotates the glass blank 1' counterclockwise. Then, when the rotation speed of the glass blank 1' becomes constant, irradiation of the outer circumferential end face 12' with the laser beam L is started. Here, as shown in FIG. 3A, the center position of the irradiation spot when irradiation of the outer circumferential end face 12' with the laser beam L is started is an irradiation start position SP. Then, the glass blank 1' is rotated counterclockwise at a constant speed by the rotation device 20 while the outer circumferential end face 12' is irradiated with the laser beam L. For example, when the glass blank 1' is rotated 180 degrees counterclockwise, as shown in FIG. 3B, the outer circumferential end face 12' is irradiated with the laser beam L clockwise along a region corresponding to half of the circumference from the irradiation start position SP to the current irradiation position. In other words, by rotating the glass blank 1' by 180 degrees, the irradiation start position SP of the laser beam L on the outer circumferential end face 12' moves by half the circumference in the counterclockwise direction. Then, the glass blank 1' is further rotated 180 degrees, whereby the entire region corresponding to one lap of the outer circumferential end face 12' is irradiated with the laser beam L. That is, by rotating the glass blank 1' counterclockwise by 360 degrees using the rotation device 20, the irradiation start position SP of the laser beam L on the outer circumferential end face 12' moves one lap in the counterclockwise direction.

Figure 3C:
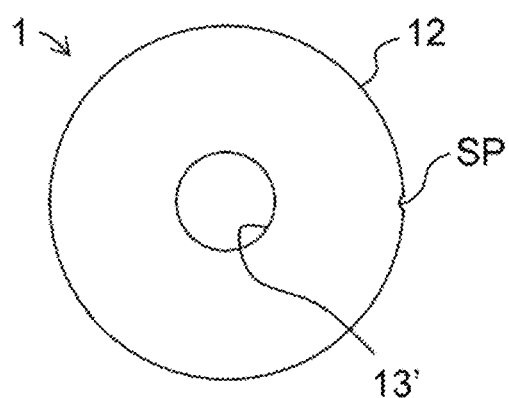
FIG. 3C is a diagram showing the appearance of the outer circumferential end face of the glass substrate when irradiation of the outer circumferential end face of the glass blank with the laser beam has been completed for one lap.

Here, if the irradiation with the laser beam L is ended when a region corresponding to one lap of the outer circumferential end face 12' of the glass blank 1' has been irradiated with the laser beam L, the roundness of the outer circumferential end face 12 of the glass substrate 1 may deteriorate (increase). In view of this, the inventors investigated the cause of the deterioration of the roundness of the outer circumferential end face 12 of the glass substrate 1 and found that, as shown in FIG. 3C, the irradiation start position SP of the laser beam L and its vicinity on the outer circumferential end face 12 of the glass substrate 1 may be slightly recessed inward in the radial direction with respect to other regions of the outer circumferential end face 12 of the glass substrate 1 to a degree that is not noticeable by eyesight. That is, it was found that a slight recess may occur at one location on the outer circumferential end face 12 of the glass substrate 1. The reason for the slight recess is not entirely clear, but one factor is assumed to be that heating is likely to be insufficient at the irradiation start position SP of the laser beam L, and the amount of radial outward protrusion at the irradiation start position SP and its vicinity tends to be smaller than in other regions. When glass substrate 1 is used as a magnetic-disk substrate and the magnetic disk rotates at high speed, a slight recess (recessed portion) on the outer circumferential end face 12 of the glass substrate 1 can disrupt the air flow and cause fluttering.

Figure 4:
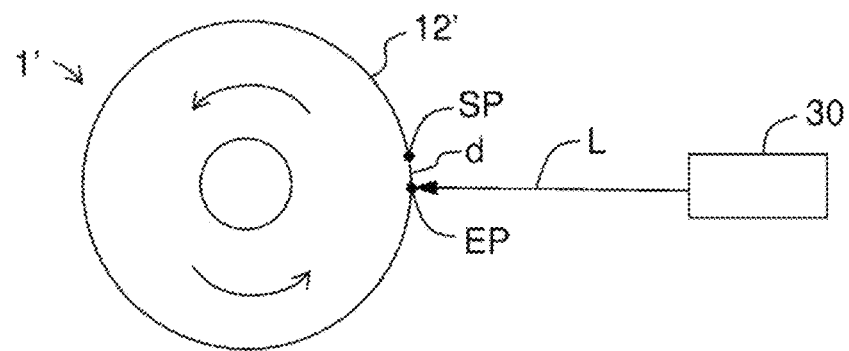
FIG. 4 is a diagram showing a state where an outer circumferential end face of a glass blank is irradiated with a laser beam along a distance longer than one lap in end face processing using a laser beam, the end face processing being included in the manufacturing method of the present embodiment.

In view of this, in this embodiment, as shown in FIG. 4, the glass blank 1' is rotated counterclockwise by more than 360 degrees, and the outer circumferential end face 12' is irradiated with the laser beam L along a distance longer than one lap. That is, irradiation with the laser beam L is performed along a distance longer than one lap of the outer circumferential end face 12' of the glass blank 1'. In other words, after the movement of the irradiation start position SP of the laser beam L on the outer circumferential end face 12' exceeds the distance of one lap, the irradiation with the laser beam L is ended and the rotation of the glass blank 1' by the rotation device 20 is ended. In other words, an irradiation end position EP, which is the center position of the irradiation spot when the irradiation of the outer circumferential end face 12' with the laser beam L is ended, is on the region of the outer circumferential end face 12' that has already been irradiated with the laser beam L. As a result, at least the irradiation start position SP is irradiated twice with the laser beam L. As a result, the insufficient heating at the irradiation start position SP is compensated for, and the amount of radial outward protrusion at the irradiation start position SP and its vicinity can be made greater than in the case where irradiation with the laser beam L is performed once. Also, the depth of the recess formed at the irradiation start position SP and its vicinity can be reduced. That is, irradiation with the laser beam L is performed along a distance longer than one lap of the outer circumferential end face 12' of the glass blank 1' so as to reduce the size of the recess formed in the outer circumferential end face 12 by the irradiation. Note that in this embodiment, the depth of the recess in the outer circumferential end face 12 of the glass substrate 1 means the depth of the recess in the radial direction of the glass substrate 1. That is, the depth of the recess is equal to the difference between the radius of a reference circle (least squares circle) of a perfect circle obtained by using the least squares method on remaining data resulting from removing data of the recess portion from data of an entire contour line of the outer circumferential end face 12, and the distance from the center of the reference circle to the part of the recess that is the closest to the center of the reference circle. The roundness of the outer circumferential end face 12 of the glass substrate 1 is defined as the difference between the radii of two perfect circles (an inscribed circle and a circumscribed circle) with the same center when the contour line of the outer circumferential end face 12 of the glass substrate 1 is sandwiched between the two circles, the interval between the two circles being at the minimum. The contour line of the outer circumferential end face 12 of the glass substrate 1 can be obtained, for example, by disposing a plate-shaped probe longer than the plate thickness of the glass substrate 1 so as to oppose the outer circumferential end face 12 in the thickness direction of the glass substrate 1, and rotating the glass substrate 1 in the circumferential direction. The roundness of the outer circumferential end face 12 of the glass substrate 1 can be measured using, for example, a roundness measuring machine. Here, the roundness of the outer circumferential end face 12 excluding the recessed portion is sufficiently smaller than the depth of the recess formed at the irradiation start position SP and its vicinity. For this reason, according to the definition of roundness, the depth of the recess formed at the irradiation start position SP and its vicinity is substantially represented by the roundness of the outer circumferential end face 12 of the glass substrate 1, and therefore the roundness of the outer circumferential end face 12 of the glass substrate 1 can be made smaller by reducing the depth of the recess. It is preferable that irradiation with the laser beam L is performed along a distance longer than one lap of the outer circumferential end face 12' of the glass blank 1', whereby the depth of the recess at the irradiation start position SP of the laser beam L and its vicinity is 15 µm or less. That is, it is preferable that irradiation with the laser beam L is performed so that the recess formed on the outer circumferential end face 12 is 15 µm or less. That is, it is preferable that the roundness of the outer circumferential end face 12 of the glass substrate 1 is 15 µm or less. The roundness is more preferably 10 µm or less, 6 µm or less, and 5 µm or less, in the stated order. Also, from the viewpoint of reducing the roundness, it is preferable that a distance d from the irradiation start position SP to an irradiation end position EP, which is the distance over which irradiation with the laser beam L is performed in an overlapping manner along the outer circumferential end face 12' of the glass blank 1', is greater than or equal to the width of the spot diameter of the laser beam L on the outer circumferential end face 12' in the circumferential direction of the outer circumferential end face 12'. In this way, the roundness of the outer circumferential end face 12 of the glass substrate 1 can be set to 15 µm or less. Also, it is more preferable that the distance d is 1.25 times or more the above-described width from the viewpoint of reducing the roundness. In this way, the roundness of the outer circumferential end face 12 of the glass substrate 1 can be set to 5 µm or less.

Similarly to the outer circumferential end face 12', by irradiating the inner circumferential end face 13' with the laser beam L along a distance longer than one lap, that is, by performing irradiation with the laser beam L along a distance longer than one lap of the inner circumferential end face 13' of the glass blank 1', the amount of radial inward protrusion at the irradiation start position and its vicinity can be made greater than when irradiation with the laser beam L is performed once. The depth of the recess formed at the irradiation start position and its vicinity can thereby be reduced. That is, irradiation with the laser beam L is performed along a distance longer than one lap of the inner circumferential end face 13' of the glass blank 1' so as to reduce the size of the recess formed on the inner circumferential end face 13 by the irradiation. Note that in this embodiment, the depth of the recess in the inner circumferential end face 13 of the glass substrate 1 means the depth of the recess in the radial direction of the glass substrate 1. That is, the depth of the recess is equal to the difference between the radius of a reference circle (least squares circle) of a perfect circle obtained by using the least squares method on remaining data resulting from removing data of the recess portion from data of an entire contour line of the inner circumferential end face 13, and the distance from the center of the reference circle to the part of the recess that is the farthest from the center of the reference circle. The roundness of the inner circumferential end face 13 of the glass substrate 1 is defined as the difference between the radii of two perfect circles (an inscribed circle and a circumscribed circle) with the same center when the contour line of the inner circumferential end face 13 of the glass substrate 1 is sandwiched between the two circles, the interval between the two circles being at the minimum. The contour line of the inner circumferential end face 13 of the glass substrate 1 can be obtained by disposing a plate-shaped probe longer than the plate thickness of the glass substrate 1 so as to oppose the inner circumferential end face 13 in the thickness direction of the glass substrate 1, and rotating the glass substrate 1 in the circumferential direction. The roundness of the inner circumferential end face 13 of the glass substrate 1 can be measured using a roundness measuring machine, similarly to the roundness of the outer circumferential end face 12. Here, the roundness of the inner circumferential end face 13 excluding the recessed portion is sufficiently smaller than the depth of the recess formed at the irradiation start position and its vicinity. For this reason, according to the definition of roundness, the depth of the recess formed at the irradiation start position and its vicinity is substantially represented by the roundness of the inner circumferential end face 13 of the glass substrate 1, and therefore the roundness of the inner circumferential end face 13 of the glass substrate 1 can be made smaller by reducing the depth of the recess. It is preferable that irradiation with the laser beam L is performed along a distance longer than one lap of the inner circumferential end face 13' of the glass blank 1', whereby the depth of the recess at the irradiation start position of the laser beam L and its vicinity is 15 µm or less. That is, it is preferable that the roundness of the inner circumferential end face 13 of the glass substrate 1 is 15 µm or less. The roundness is more preferably 10 µm or less, 6 µm or less, and 5 µm or less, in the stated order. Also, from the viewpoint of reducing roundness, it is preferable that a distance from the irradiation start position to the irradiation end position, which is the distance over which irradiation with the laser beam L is performed in an overlapping manner along the inner circumferential end face 13' of the glass blank 1', is greater than or equal to the width of the spot diameter of the laser beam L on the inner circumferential end face 13' in the circumferential direction of the inner circumferential end face 13'. In this way, the roundness of the inner circumferential end face 13 of the glass substrate 1 can be set to 15 µm or less. Also, it is more preferable that the distance is 1.25 times or more the above-described width from the viewpoint of reducing the roundness. In this way, the roundness of the inner circumferential end face 13 of the glass substrate 1 can be set to 6 µm or less.

(Main Surface Processing)

Note that in the manufacturing method of this embodiment, main surface grinding processing, main surface polishing processing, and the like may be performed after the end face processing performed using the above-mentioned laser beam. In the following description, the glass blank after end face processing using the laser beam will also be referred to as a glass substrate.

In the main surface grinding processing, the main surfaces 11a and 11b of the glass substrate 1 are ground using, for example, a double-side grinding device provided with a planetary gear mechanism. The grinding allowance is, for example, approximately several µm to 300 µm. The double-side grinding device includes an upper surface plate and a lower surface plate, and the glass substrate 1 is held between the upper surface plate and the lower surface plate. Then, main surfaces 11a' and 11b' are ground by moving the glass substrate 1 and the surface plates relative to each other. A grinding sheet with fixed abrasive particles formed by fixing abrasive particles made of diamond or the like in a resin may be attached to the surface of the surface plate. Note that the main surface grinding processing may also be omitted.

In the main surface polishing processing, the main surfaces 11a' and 11b' of the glass substrate 1 are polished. The polishing allowance is, for example, approximately 0.1 µm to 100 µm. The main surfaces are polished for the purpose of removing flaws and warping remaining on the main surfaces 11a' and 11b' due to previous processing, reducing undulations, minute undulations, and roughness, and performing mirror-finishing of the main surfaces 11a' and 11b'. When polishing the main surfaces, a polishing liquid containing, for example, cerium oxide abrasive particles, zirconia abrasive particles (particle size: D50, about 0.5 to 2 µm), or silica abrasive particles (particle size: D50, about 10 to 100 nm) as loose abrasive particles is used. Note that the main surface polishing processing may be implemented in two or more stages.

According to the above-described manufacturing method of an aspect of the present invention, by performing irradiation with the laser beam L along the outer circumferential end face 12' and the inner circumferential end face 13' of the glass blank 1', a glass substrate 1 can be manufactured in which the outer circumferential end face 12 and the inner circumferential end face 13 are smoothed. Also, since the connection portions between the outer circumferential end face 12 and the main surfaces 11a and 11b are chamfered, the outer circumferential end face 12 can be processed into, for example, a smoothly-curved shape such that the central portion in the thickness direction of the glass substrate 1 protrudes outward in the radial direction of the glass substrate 1. Furthermore, since the connection portions between the inner circumferential end face 13 and the main surfaces 11a and 11b are chamfered, the inner circumferential end face 13 can be processed into, for example, a smoothly-curved shape such that the central portion in the thickness direction of the glass substrate 1 protrudes inward in the radial direction of the glass substrate 1. That is, the outer circumferential end face 12' of the glass blank 1' can be irradiated with the laser beam L to soften or melt at least a part of the outer circumferential end face 12' and chamfer the areas between the main surfaces 11a and 11b and the outer circumferential end face 12. Similarly, the inner circumferential end face 13' of the glass blank 1' can be irradiated with the laser beam L to soften or melt at least a part of the inner circumferential end face 13' and chamfer the areas between the main surfaces 11a and 11b and the inner circumferential end face 13.

According to the above-described manufacturing method of an aspect of the present invention, irradiation with the laser beam L is performed along a distance longer than one lap of each of the outer circumferential end face 12' and the inner circumferential end face 13' of the glass blank 1'. This allows the amount of radial outward protrusion at the irradiation start position and its vicinity on the outer circumferential end face 12 to be greater than in the case where irradiation with the laser beam L is performed once. Similarly, the amount of radial inward protrusion at the irradiation start position and its vicinity on the inner circumferential end face 13 can be made larger than in the case where irradiation with the laser beam L is performed once. As a result, the roundnesses of the outer circumferential end face 12 and the inner circumferential end face 13 of the glass substrate 1 can be made smaller than when irradiation with the laser beam L is performed along a distance of only one lap of each of the outer circumferential end face 12' and the inner circumferential end face 13' of the glass blank 1'. In other words, a shortage of the amount of protrusion outward or inward in the radial direction that occurs in the vicinity of the irradiation start position SP of the laser beam L can be compensated for. Note that if irradiation with the laser beam L is performed along a distance of two or more laps, the processing time will become longer and the productivity may deteriorate. From the viewpoint of productivity, it is more preferable that irradiation with the laser beam L is performed along a distance shorter than 1.5 laps (a distance shorter than 0.5 laps past 1 lap) of each of the outer circumferential end face 12' and the inner circumferential end face 13' of the glass blank 1', and even more preferable that irradiation with the laser beam L is performed along a distance shorter than 1.25 laps (a distance shorter than 0.25 laps past 1 lap).

Example 1-1

In order to confirm the effect of end face processing using a laser beam, which is included in the manufacturing method of this embodiment, irradiation with a laser beam was performed along the outer circumferential end faces of annular glass blanks while changing the overlapping irradiation distance (distance on the outer circumferential end face between the irradiation start position and the irradiation end position), and then the roundnesses of the outer circumferential end faces were measured. The annular glass blanks had an outer diameter of 97 mm, an inner diameter of 25 mm, and a thickness of 0.6 mm. The outer circumferential end face and the inner circumferential end face of this glass blank were both faces approximately perpendicular to the main surfaces. Before irradiation with the laser beam was performed, the roundness of the outer circumferential end face was 5 µm, and the roundness of the inner circumferential end face was 4 µm. A $CO_2$ laser was used as the laser beam, and the laser beam had a power of 50 W and a spot diameter of 2 mm (a circle with a diameter of 2 mm). That is, the length of the spot diameter of the laser beam on the outer circumferential end face in the circumferential direction of the outer circumferential end face is 2 mm. Then, while heating the glass blank as appropriate, the glass blank was irradiated with the laser beam such that the luminous flux (spot) of the laser beam spread evenly on both sides in the thickness direction of the glass blank. The rotation speed of the glass blank (relative speed at the irradiation position) was set to 20 mm/s. After irradiation with the laser beam was performed, the roundness of the outer circumferential end face was measured using a roundness measuring machine. The results are shown in Table 1-1 below. After the above processing, the outer circumferential end face was chamfered between the two main surfaces, forming a single curved surface overall. The length of the chamfered surface in the radial direction of the main surface was within the range of 30 to 150 µm.

TABLE 1-1

|  | Overlapping irradiation distance [mm] | Roundness [µm] |
|---|---|---|
| Condition 1 | 0.0 | 43 |
| Condition 2 | 0.5 | 35 |
| Condition 3 | 1.0 | 31 |
| Condition 4 | 1.5 | 22 |
| Condition 5 | 2.0 | 12 |
| Condition 6 | 2.5 | 4 |
| Condition 7 | 3.0 | 4 |
| Condition 8 | 3.5 | 4 |
| Condition 9 | 4.0 | 4 |
| Condition 10 | 4.5 | 5 |
| Condition 11 | 5.0 | 5 |

The arithmetic mean roughness Ra was determined for the region on the outer circumferential end face where irradiation with the laser beam was performed in an overlapping manner (hereinafter referred to as the overlapping irradiation region) and the other regions. Note that the arithmetic mean roughness Ra is a value conforming to JIS B0601:2001. The surface shape of the outer circumferential end face was measured using a laser microscope to obtain the arithmetic mean roughness Ra. The Ra of the overlapping irradiation region was 0.03 µm under conditions 2 to 11, whereas the Ra of the other regions was 0.05 µm under conditions 1 to 11. That is, each outer circumferential end face had one region with a low Ra (low-roughness region) and one region with a high Ra (high-roughness region).

Example 1-2

The same conditions as in Example 1-1 were used, except that the spot shape of the laser beam on the outer circumferential end face was an ellipse with a length of 4 mm in the circumferential direction of the outer circumferential end face and a length of 1 mm in the plate thickness direction, and the overlapping irradiation distance was increased. After irradiation with the laser beam, the roundness of the outer circumferential end face was measured. The results are shown in Table 1-2 below.

TABLE 1-2

|  | Overlapping irradiation distance [mm] | Roundness [µm] |
|---|---|---|
| Condition 12 | 0.0 | 40 |
| Condition 13 | 0.5 | 37 |
| Condition 14 | 1.0 | 34 |
| Condition 15 | 1.5 | 30 |
| Condition 16 | 2.0 | 27 |
| Condition 17 | 2.5 | 23 |
| Condition 18 | 3.0 | 20 |
| Condition 19 | 3.5 | 17 |
| Condition 20 | 4.0 | 13 |
| Condition 21 | 4.5 | 9 |
| Condition 22 | 5.0 | 4 |
| Condition 23 | 6.0 | 4 |
| Condition 24 | 8.0 | 4 |
| Condition 25 | 10.0 | 5 |

Similarly to Example 1-1, the arithmetic mean roughness Ra was determined for the overlapping irradiation region and the other regions. The Ra of the overlapping irradiation region was 0.02 µm under conditions 13 to 25, whereas the Ra of the other regions was 0.03 µm under conditions 12 to 25. That is, each outer circumferential end face had one region with a low Ra (low-roughness region) and one region with a high Ra (high-roughness region).

Example 2-1

In order to confirm the effect of end face processing using a laser beam, which is included in the manufacturing method of this embodiment, irradiation with a laser beam was performed along the inner circumferential end faces of annular glass blanks while changing the overlapping irradiation distance (the distance on the inner circumferential end face between the irradiation start position and the irradiation end position), and then the roundnesses of the inner circumferential end faces were measured. The glass blanks, the laser beam, the conditions for irradiating with the laser beam, and the rotation speeds of the glass blanks were the same as in Example 1-1. Also, similarly to Example 1-1, after irradiation with the laser beam, the roundnesses of the inner circumferential end faces 13 were measured. The results are shown in Table 2-1 below.

TABLE 2-1

| | Overlapping irradiation distance [mm] | Roundness [μm] |
|---|---|---|
| Condition 26 | 0.0 | 45 |
| Condition 27 | 0.5 | 37 |
| Condition 28 | 1.0 | 32 |
| Condition 29 | 1.5 | 24 |
| Condition 30 | 2.0 | 14 |
| Condition 31 | 2.5 | 5 |
| Condition 32 | 3.0 | 5 |
| Condition 33 | 3.5 | 5 |
| Condition 34 | 4.0 | 5 |
| Condition 35 | 4.5 | 6 |
| Condition 36 | 5.0 | 6 |

Furthermore, the arithmetic mean roughness Ra was determined for each of the overlapping irradiation region and the other regions on the inner circumferential end face. The Ra of the overlapping irradiation region was 0.03 μm under conditions 27 to 36, whereas the Ra of the other regions was 0.05 μm under conditions 26 to 36. That is, each inner circumferential end face had one region with a low Ra (low-roughness region) and one region with a high Ra (high-roughness region).

Example 2-2

The same conditions as in Example 2-1 were used, except that the spot shape of the laser beam on the inner circumferential end face was an ellipse with a length of 4 mm in the circumferential direction of the inner circumferential end face and a length of 1 mm in the plate thickness direction, and the overlapping irradiation distance was increased. After irradiation with the laser beam, the roundness of the inner circumferential end face was measured. The results are shown in Table 2-2 below.

TABLE 2-2

| | Overlapping irradiation region [mm] | Roundness [μm] |
|---|---|---|
| Condition 37 | 0.0 | 41 |
| Condition 38 | 0.5 | 33 |
| Condition 39 | 1.0 | 29 |
| Condition 40 | 1.5 | 26 |
| Condition 41 | 2.0 | 23 |
| Condition 42 | 2.5 | 21 |
| Condition 43 | 3.0 | 18 |
| Condition 44 | 3.5 | 17 |
| Condition 45 | 4.0 | 13 |
| Condition 46 | 4.5 | 10 |
| Condition 47 | 5.0 | 5 |
| Condition 48 | 6.0 | 5 |
| Condition 49 | 8.0 | 5 |
| Condition 50 | 10.0 | 6 |

Similarly to Example 2-1, the arithmetic mean roughness Ra was determined for the overlapping irradiation region and the other regions. The Ra of the overlapping irradiation region was 0.02 μm under conditions 38 to 50, whereas the Ra of the other regions was 0.03 μm under conditions 37 to 50. That is, each inner circumferential end face had one region with a low Ra (low-roughness region) and one region with a high Ra (high-roughness region).

From the results shown in Tables 1-1 and 1-2 above, it can be understood that when irradiation with the laser beam was performed along a distance longer than one lap of the outer circumferential end face of the glass blank (conditions 2 to 11 and conditions 13 to 25), the roundness of the outer circumferential end face was smaller than when irradiation with the laser beam was performed along a distance of only one lap of the outer circumferential end face (condition 1 and condition 12). It can also be understood that when the overlapping irradiation distance of the laser beam is greater than or equal to the length of the spot diameter in the circumferential direction of the outer circumferential end face, the roundness of the outer circumferential end face is 15 μm or less. Furthermore, it can be understood that when the overlapping irradiation distance of the laser beam is 1.25 times or more the length of the spot diameter in the circumferential direction of the outer circumferential end face, the roundness of the outer circumferential end face is 5 μm or less. However, it can be understood that when the overlapping irradiation distance of the laser beam exceeds twice the length of the spot diameter of the laser beam in the circumferential direction of the outer circumferential end face, the roundness of the outer circumferential end face becomes slightly larger. This is thought to be because, within the overlapping irradiation region, the region that protrudes due to the first irradiation protrudes farther due to being heated again in the second irradiation. Here, the reason for the slight increase in roundness is assumed to be because the laser beam is less likely to be absorbed inside of the glass due to the smoothing of the end face and the shape change of the end face due to chamfering, which are caused by the first irradiation. On the outer circumferential end face, the overlapping irradiation region was a low-roughness region with a lower arithmetic mean roughness Ra than the other regions (regions irradiated only once). Here, the longer the overlapping irradiation distance of the laser beam is, or in other words, the longer the length of the overlapping irradiation region of the laser beam is, the longer the irradiation time of the laser beam is, and therefore the lower the productivity is. For this reason, from the viewpoint of productivity, it is preferable that the overlapping irradiation distance of the laser beam is as short as possible within a range in which the roundness of the outer circumferential end face can be reduced. Also, by shortening the overlapping irradiation distance of the laser beam, the proportion of the low-roughness region on the outer circumferential end face can be reduced. That is, since the roughness of the outer circumferential end face is more even in the circumferential direction, it is possible to reduce the risk of dropping or the like due to an imbalance in contact friction with a jig when the outer circumferential end face is gripped and handled with a jig. Also, when used as a magnetic-disk glass substrate, after installation in an HDD device, the air resistance during high-speed rotation tends to be constant, making the rotation more stable. The length of the low-roughness region is preferably 10% or less, and more preferably 5% or less of the circumferential length of the outer circumferential end face. If the length of the low-roughness region exceeds 10%, gripping errors by the jig or airflow turbulence during high-speed rotation may occur more easily. The lower limit of the length of the low-roughness region can be, for example, 0.10% or more of the circumferential length of the outer circumferential end face, but is more preferably 0.2% or more, and even more preferably 0.5% or more of the circumferential length thereof. If the length of the low-roughness region is less than 0.10% of the circumferential length thereof, the roundness may not be reduced sufficiently.

From the results shown in Tables 2-1 and 2-2 above, it can be understood that when the irradiation with the laser beam is performed along a distance longer than one lap of the inner circumferential end face of the glass blank (conditions 27 to 36 and conditions 38 to 50), the roundness of the inner circumferential end face is smaller than when irradiation with the laser beam is performed along a distance of only one lap of the inner circumferential end face (conditions 26 and condition 37). It can also be understood that when the overlapping irradiation distance of the laser beam is greater than or equal to the length of the spot diameter in the circumferential direction of the inner circumferential end face, the roundness of the inner circumferential end face becomes 15 μm or less. Furthermore, it can be understood that when the overlapping irradiation distance of the laser beam is 1.25 times or more the length of the spot diameter in the circumferential direction of the inner circumferential end face, the roundness of the inner circumferential end face becomes 6 μm or less. However, it can be understood that when the overlapping irradiation distance of the laser beam exceeds twice the length of the spot diameter of the laser beam in the circumferential direction of the inner circumferential end face, the roundness of the inner circumferential end face becomes slightly larger. This is thought to be because, as in the case of the outer circumferential end face, the region of the overlapping irradiation region that protrudes due to the first irradiation protrudes farther due to being heated again by the second irradiation. Here, the reason for the slight increase in roundness is assumed to be because the laser beam is less likely to be absorbed inside of the glass due to the smoothing of the end face and the shape change of the end face due to chamfering, which are caused by the first irradiation. Also, on the inner circumferential end face, the overlapping irradiation region was a low-roughness region having a lower arithmetic mean roughness Ra than the other regions (regions irradiated only once). Here, the longer the overlapping irradiation distance of the laser beam is, the longer the irradiation time of the laser beam becomes, and therefore the lower the productivity becomes. For this reason, in the end face processing performed on the inner circumferential end face as well, it is preferable from the viewpoint of productivity that the overlapping irradiation distance of the laser beam is as short as possible within a range in which the roundness of the inner circumferential end face can be reduced. By shortening the overlapping irradiation distance of the laser beam, the proportion of the low-roughness region on the inner circumferential end face can be reduced. That is, since the roughness of the inner circumferential end face is more even in the circumferential direction, it is possible to reduce the risk of dropping or the like due to an imbalance in contact friction with the jig when the inner circumferential end face is gripped and handled with the jig. Also, when used as a magnetic-disk glass substrate, it is possible to reduce the trouble of getting caught when fitting the substrate onto the spindle of an HDD device. The length of the low-roughness region is preferably 15% or less, and more preferably 10% or less of the circumferential length of the inner circumferential end face. If the length exceeds 15%, errors in gripping by the jig or trouble when fitting into the spindle may be more likely to occur. The lower limit of the length of the low-roughness region can be, for example, 0.5% or more of the circumferential length of the inner circumferential end face, but is more preferably 2% or more, and even more preferably 3% or more. If the length is less than 0.5%, the roundness may not be reduced sufficiently.

Also, it is preferable that the roughness (Ra) of both the low-roughness region and the high-roughness region on each of the outer circumferential end face and the inner circumferential end face is 0.05 μm or less. If the Ra exceeds 0.05 μm, foreign matter is more likely to adhere to the end face in some cases. The difference (absolute value) in roughness (Ra) between the low-roughness region and the high-roughness region is preferably 0.03 μm or less. Note that the lower limit of the difference in roughness (Ra) between the low-roughness region and the high-roughness region can be, for example, 0.001 μm, but is more preferably 0.002 μm or more, and even more preferably 0.005 μm or more. By keeping the difference in roughness within the above range, the difference in roughness can be suppressed to an appropriate range, and therefore it is possible to reduce trouble such as failure to grip (handle) with the jig while reducing the roundness.

Although the embodiments of the present invention have been described thus far, the present invention is not limited to the embodiments above, and various modifications can be made within the scope recited in the claims. Hereinafter, modified examples of the embodiments above will be described.

In the above-described embodiment, the rotation direction of the glass blank 1' by the rotation device 20 is counter-clockwise, but the rotation direction of the glass blank 1' by the rotation device 20 may be clockwise. In this case, irradiation with the laser beam L is performed in a counter-clockwise direction along the outer circumferential end face 12' and the inner circumferential end face 13'. In the above embodiment, irradiation with the laser beam L was started when the rotation speed of the glass blank 1' became constant. However, there is no limitation to this, and irradiation with the laser beam L may be started at the same time as the rotation of the glass blank 1' starts, or irradiation with the laser beam L may be started before the rotation speed of the glass blank 1' becomes constant.

In the above-described embodiment, the glass blank 1' is rotated by the rotation device 20 while being irradiated with the laser beam L from the fixed laser irradiation device 30, but there is no limitation to this. For example, by driving an optical system such as a micromirror device provided in the laser irradiation device 30 to continuously deflect the luminous flux, the outer circumferential end face 12' and the inner circumferential end face 13' of the glass blank 1' fixed to a placement platform may be irradiated with the laser beam L while moving the laser beam L in the circumferential direction.

In the above-described embodiment, irradiation of the outer circumferential end face 12' of the glass blank 1' with the laser beam L and irradiation of the inner circumferential end face 13' with the laser beam L are performed separately using a single laser irradiation device 30, but irradiation of the inner circumferential end face 13' may be performed after irradiation of the outer circumferential end face 12' ends, or irradiation of the outer circumferential end face 12' may be performed after irradiation of the inner circumferential end face 13' ends. Alternatively, the outer circumferential end face 12' and the inner circumferential end face 13' may be processed simultaneously by simultaneously irradiating the outer circumferential end face 12' and the inner circumferential end face 13' with laser beams L from two laser irradiation devices 30, or by splitting the laser beam L emitted from one laser irradiation device 30 into two and irradiating the end faces with respective laser beams L.

As described in the above embodiment, irradiation with the laser beam L may be on only one of the outer circumferential end face 12' and the inner circumferential end face 13' of the glass blank 1'. In this case, the end faces that have not been irradiated with the laser beam L can be chamfered by performing known grinding processing using a formed grindstone. Also, by subjecting the end faces to known end face polishing processing using an abrasive brush and loose abrasive particles, the surface roughnesses of the end faces can be reduced.

In the above embodiment, the glass blank 1' has an annular shape with a circular hole formed in the center, but the circular hole need not be formed in the center. In this case, the glass blank 1' has only an outer circumferential end face 12', and the end face processing using the laser beam is performed only on the outer circumferential end face 12'.

The glass substrate 1 manufactured using the manufacturing method of the above-described embodiment is used as a magnetic-disk glass substrate. However, there is no limitation to this and the glass substrate 1 can be used for any purpose.

In the above-described embodiments, the end face processing using the laser beam is performed on the end faces of the disk-shaped glass blank 1'. However, there is no limitation thereto, and the end face processing can also be applied to the end faces of a disk-shaped metal plate.

According to a first aspect of this disclosure, there is provided a disk-shaped glass substrate manufacturing method for manufacturing a disk-shaped glass substrate, including:
preparing a disk-shaped glass blank having a main surface and an outer circumferential end face; and
performing irradiation with a laser beam along a distance longer than one lap of the outer circumferential end face of the disk-shaped glass blank.

In the disk-shaped glass substrate manufacturing method according to the first aspect of this disclosure, the irradiation with the laser beam may be performed along a distance shorter than two laps of the outer circumferential end face.

In the disk-shaped glass substrate manufacturing method according to the first aspect of this disclosure, an overlapping irradiation distance along the outer circumferential end face from an irradiation start position of the laser beam to an irradiation end position of the laser beam may be greater than or equal to a length of a spot diameter of the laser beam on the outer circumferential end face in a circumferential direction of the outer circumferential end face In the disk-shaped glass substrate manufacturing method according to the first aspect of this disclosure, an overlapping irradiation distance along the outer circumferential end face from an irradiation start position of the laser beam to an irradiation end position of the laser beam may be less than or equal to twice a length of a spot diameter of the laser beam on the outer circumferential end face in a circumferential direction of the outer circumferential end face.

In the disk-shaped glass substrate manufacturing method according to the first aspect of this disclosure, a roundness of the outer circumferential end face after irradiation with the laser beam may be 15 µm or less.

In the disk-shaped glass substrate manufacturing method according to the first aspect of this disclosure, in the outer circumferential end face after irradiation with the laser beam has ended, a depth of a recess inward in a radial direction at an irradiation start position of the laser beam may be 15 µm or less.

In the disk-shaped glass substrate manufacturing method according to the first aspect of this disclosure, the disk-shaped glass substrate may be an annular glass substrate having a circular hole in the center.

According to a second aspect of this disclosure, there is provided a magnetic-disk glass substrate manufacturing method including at least polishing a main surface of a disk-shaped glass substrate manufactured using the disk-shaped glass substrate manufacturing method according the first aspect of this disclosure.

According to a third aspect of this disclosure, there is provided an annular glass substrate manufacturing method including:
preparing an annular glass blank having a main surface and an outer circumferential end face and an inner circumferential end face that are concentric with each other; and
performing irradiation with a laser beam along a distance longer than one lap of the inner circumferential end face of the annular glass blank.

In the annular glass substrate manufacturing method according to the third aspect of this disclosure, the irradiation with the laser beam may be performed along a distance shorter than two laps of the inner circumferential end face.

In the annular glass substrate manufacturing method according to the third aspect of this disclosure, an overlapping irradiation distance along the inner circumferential end face from an irradiation start position of the laser beam to an irradiation end position of the laser beam may be greater than or equal to a length of a spot diameter of the laser beam on the inner circumferential end face in a circumferential direction of the inner circumferential end face.

In the annular glass substrate manufacturing method according to the third aspect of this disclosure, an overlapping irradiation distance along the inner circumferential end face from an irradiation start position of the laser beam to an irradiation end position of the laser beam may be less than or equal to twice a length of a spot diameter of the laser beam on the inner circumferential end face in a circumferential direction of the inner circumferential end face.

In the annular glass substrate manufacturing method according to the third aspect of this disclosure, a roundness of the inner circumferential end face after irradiation with the laser beam may be 15 µm or less.

According to a fourth aspect of this disclosure, there is provided a magnetic-disk glass substrate manufacturing method including at least polishing a main surface of an annular glass substrate manufactured using the annular glass substrate manufacturing method according to the third aspect of this disclosure.

According to a fifth aspect of this disclosure, there is provided a disk-shaped glass substrate including:
a main surface; and
an outer circumferential end face,
in which the outer circumferential end face has at least two regions with different roughnesses in a circumferential direction of the outer circumferential end face.

In the disk-shaped glass substrate according to the fifth aspect of this disclosure, the at least two regions with different roughnesses may include a low-roughness region and a high-roughness region, and
in the circumferential direction of the outer circumferential end face, a length of the low-roughness region may be shorter than a length of the high-roughness region.

In the disk-shaped glass substrate according to the fifth aspect of this disclosure, the at least two regions with different roughnesses may both be regions smoothed by irradiation with a laser beam.

In the disk-shaped glass substrate according to the fifth aspect of this disclosure, a roundness of the outer circumferential end face may be 15 μm or less.

According to a sixth aspect of this disclosure, there is provided an annular glass substrate including:
a main surface; and
an outer circumferential end face and an inner circumferential end face that are concentric with each other,
in which the inner circumferential end face has at least two regions with different roughnesses in a circumferential direction of the inner circumferential end face.

In the annular glass substrate according to the sixth aspect of this disclosure, the at least two regions with different roughnesses may include a low-roughness region and a high-roughness region, and
in the circumferential direction of the inner circumferential end face, a length of the low-roughness region may be shorter than a length of the high-roughness region.

In the annular glass substrate according to the sixth aspect of this disclosure, the at least two regions with different roughnesses may both be regions smoothed by irradiation with a laser beam.

In the annular glass substrate according to the sixth aspect of this disclosure, a roundness of the inner circumferential end face may be 15 μm or less.

According to a seventh aspect of this disclosure, there is provided a magnetic-disk glass substrate obtained using the disk-shaped glass substrate according to the fifth aspect of this disclosure or the annular glass substrate according to the sixth aspect of this disclosure.

According to this disclosure, it is possible to provide a technique for smoothing an end face of a disk-shaped glass substrate or an annular glass substrate and forming a chamfered surface without deteriorating the roundness of the end face.

LIST OF REFERENCE NUMERALS

1 Glass substrate
1' Glass blank
11a, 11b, 11a', 11b' Main surface
12, 12' Outer circumferential end face
13, 13' Inner circumferential end face
20 Rotation device
21 Placement platform
22 Rotation shaft
23 Rotation motor
24 Support platform
30 Laser irradiation device
L Laser beam
SP Irradiation start position
EP Irradiation end position

The invention claimed is:
1. A disk-shaped glass substrate comprising:
a main surface; and
an outer circumferential end face,
wherein the outer circumferential end face has at least two regions with different roughnesses in a circumferential direction of the outer circumferential end face.
2. The disk-shaped glass substrate according to claim 1, wherein
the at least two regions with different roughnesses include a low-roughness region and a high-roughness region, and
in the circumferential direction of the outer circumferential end face, a length of the low-roughness region is shorter than a length of the high-roughness region.
3. The disk-shaped glass substrate according to claim 1, wherein
the at least two regions with different roughnesses are both regions smoothed by irradiation with a laser beam.
4. The disk-shaped glass substrate according to claim 1, wherein
a roundness of the outer circumferential end face is 15 μm or less.
5. A glass substrate comprising:
a main surface; and
an outer circumferential end face; and
an inner circumferential end face that has an annular shape, wherein
the inner circumferential end face has at least two regions with different roughnesses in a circumferential direction of the inner circumferential end face.
6. The glass substrate according to claim 5, wherein
the at least two regions with different roughnesses include a low-roughness region and a high-roughness region, and
in the circumferential direction of the inner circumferential end face, a length of the low-roughness region is shorter than a length of the high-roughness region.
7. The glass substrate according to claim 5, wherein
the at least two regions with different roughnesses are both regions smoothed by irradiation with a laser beam.
8. The glass substrate according to claim 5, wherein
a roundness of the inner circumferential end face is 15 μm or less.
9. The disk-shaped glass substrate according to claim 1, wherein
the main surface is a mirror surface.
10. The glass substrate according to claim 5, wherein
the glass substrate is an annular glass substrate.
11. The glass substrate according to claim 10, wherein
the main surface is a mirror surface.
12. A magnetic-disk glass substrate manufacturing method comprising:
at least polishing the main surface of the disk-shaped glass substrate according to claim 1.
13. A magnetic-disk glass substrate manufacturing method comprising:
at least polishing the main surface of the glass substrate according to claim 10.

* * * * *